Patented Oct. 26, 1943

2,332,513

UNITED STATES PATENT OFFICE 2,332,513

EXPANDED SOLID CORN SIRUP COMBINATION

Wilbert A. Heyman, New York, N. Y., assignor to Granular Foods, Inc., New York, N. Y., a corporation of Indiana No Drawing. Application August 3, 1940, Serial No. 351,266

16 Claims. (Cl. 99—142)

My invention relates to a process of forming a solid dispersion of a mixture of a fatty edible material with corn sirup or some similar suitable carbohydrate, and dehydrating and expanding the mix. My invention further relates to the dry solid expanded dispersion of fatty material and corn sirup and to the products produced therefrom by using a material per se or in admixture with other materials.

The fats that I may treat according to my invention are animal fats, such as lard, butter, milk and vegetable fats, represented by, for example, fatty legumes such as peanuts; cocoanut, pecan, walnut and the like, and fat bearing seeds, such as cacao bean, soya bean, etc.

There have been manifold problems in the food industry in connection with various fats. In the manufacture and use of fatty products, there is a great tendency for the fat particles to agglomerate and separate. This can be observed in the common use of cream, milk, oil and peanut butter. Further, the product is deleteriously effected by the separation of the oily portions not only from the standpoint of public acceptance and merchandising but also from the standpoint of increased exposure to oxidation.

It is a primary purpose of my invention to combine fats with corn sirup and convert this mixture to a solid expanded form. To effect this I change the form of fats so as to preserve their inherent desirable properties against change and to place them in a more available form for utility.

By means of a process to be more particularly described hereinafter I cause this mixture of fat such as chocolate, cocoanut or peanut butter with corn sirup to be expanded in the form of a cellular mass. This conversion of the liquid mixture into an expanded solid structure effects a physical solid dispersion of the fat in the corn sirup so that any migration or agglomeration is permanently prevented. By then physically reducing the expanded structure to the form of small discrete particles of relatively small size, I obtain a solid composition which comprises a uniform and homogeneous dry solid mix of fat and corn sirup.

The dextrin component of the corn sirup acts not only as an elastic framework which forms the cellular structure and thereby assists in the dehydration of the mixture but additionally acts as an agent to prevent the hydration of the compound.

A further new and unexpected result of the combination I set forth is that the expanded cellular mixture of dry corn sirup and fat exhibits an unusual stability in respect to oxidation in spite of the fact that greatly increased areas are exposed to the action of air. This is believed to be the result of the close association of the reducing sugars such as dextrose and maltose of the corn sirup with the fat. The dextrin component also is believed to act as an inhibitor of oxidation by a coating action.

It is a further important property of my expanded dry mix that it has an extremely low moisture content and is therefore relatively resistant to the taking up of deleterious quantities of water in the normal periods of storage and use.

It is a fact that the hygroscopic properties of a material increase or accelerate as water is absorbed and that if the initial moisture content can be reduced to a low point, the rapidity of the absorption of water is greatly reduced.

With regard to the fats which may be treated according to the process described I use cocoanut, chocolate, peanut butter and other fats of similar nature. In the case of nuts, the process is applicable to most members of the nut family such as peanuts, walnuts, hazel nuts, pecans and the like.

A further feature of my invention lies in the new and unexpected property of flavor retention obtained by the combination of the corn sirup with the fat. It is believed possible that the dextrose component of the corn sirup which is an aldehyde is responsible for the flavor retention and this may result from the dextrose component in a manner which is now not clearly understood.

I have found that by the combination of these fats with dextrose that the flavors that are characteristic of the particular fatty material are retained over a relatively long period of time. These flavors, also, are obtained in the fluids in which the dry mix is redissolved.

The present process may be employed for both animal fats and vegetable fats both plain and homogenized. Such foods as milk which is an emulsion of fat in water may also be concentrated and stabilized by means of the present invention.

Thus, I may form a new product comprising a solid powdered milk by concentrating the ordinary aqueous emulsion that comprises milk and combining that concentrate with corn sirup. The mix is then boiled under a high vacuum according to the process of my invention, whereupon a dehydrated solid expanded mass is produced. The expanded structure represents a solid dispersed mixture of fat solids. This expanded structure is then physically reduced by grinding and/or screening to a reduced size particle form which can be redissolved when desired in a fluid to be placed in available form for consumption.

It is a further object of my invention to provide as a new article of manufacture a powdered combination of a food fat such as lard by homogeneously mixing the lard with corn sirup, drying and expanding the mixture into an expanded cellular form and subsequently reducing the expanded form into relatively small dry particle size.

This dry solid mix in particle form of food fat and dried corn sirup can then be easily intermixed with flour to form a prepared predetermined mix. This mixture is valuable particularly because of the ordinary difficulty in obtaining an homogeneous mixture of the food fat such as lard in the flour.

A further valuable property of this mixture lies in the protection of the food fat against rancidity afforded by the reducing sugar component of the dry corn sirup.

My process is particularly valuable in connection with chocolate. Chocolate is a well known article of commerce consisting of the roasted and ground nib of the cacao bean and contains, among other products, about 52% fat and a quantity of starch, together with minute amounts of components which are directly responsible for the flavor which is developed during the roasting process. These flavor components are believed to be in the form of volatile fixed acids, aldehydes and ketones. When chocolate is made by grinding the roasted nibs, the heat of friction transforms the nibs into a viscous free flowing liquid because of the melting of the fat. When this product is cooled, it hardens into the well known character of bitter chocolate, which is quite insoluble in cold water or cold milk because of the protective coating of the fat, and dispersion can only be effected by heating the mix above the melting point of the fat. The finely divided particles are only partially soluble, the fat fibre and starch remaining insoluble. If the temperature is raised to more than 160° F. the starch gelatinizes to form a colloid emulsion which partly holds some of the more finely divided particles in suspension. However, chocolate candy of commerce cannot be heated higher than 140° F. because temperatures higher than 140° F. drive off much of the delicate volatile flavor components and result in an inferior tasting chocolate product.

Efforts have been made to powder chocolate but the high butter fat content makes this impractical. Other attempts have been made to reduce the butter fat by mixing the chocolate with sugar, but this merely coats the sugar with fat and prevents it from being miscible in aqueous solutions.

Cocoa, the article of commerce is prepared by first expressing butter fat from chocolate liquor and then grinding the resultant pressed cake deprived of some of its fat. Because the fat has been removed, it is possible to grind this product under proper conditions and sift it into powder of the desired particle size. The grinding process, however, coats the fibrous particles of the cocoa with the fat and the cocoa is accordingly immiscible in cold aqueous liquids.

Attempts have been made to prepare cocoa in a mix which would increase its miscibility and solubility in cold aqueous fluids such as milk and water and I have covered a method for doing this in my Patent Nos. 1,689,028 and 1,689,029, issued October 23, 1928.

However, all efforts have failed to effectively transform chocolate into granule or powder form, which would be miscible in relatively cold aqueous fluids while still retaining the extremely desirable rich natural flavor and aroma of the chocolate.

Chocolate has a flavor far superior to that of cocoa. The grinding and pressure extraction through which the original chocolate is converted into cocoa results in the loss by conversion and evaporation of most, if not all, of the delicate aroma and taste factors of the original chocolate.

Most, if not practically all, of the so-called chocolate sirups and chocolate milk drinks now sold extensively throughout the trade are made with cocoa because it is available in a powder form. The usual practice is to heat the cocoa with boiling water, and add the required amount of sugar to make a sirup. The heating of the cocoa and the preparation of the chocolate sirups drive off still more of the flavor factors resulting in a far inferior chocolate product made from a product which is already inferior in flavor and which has been deprived of its principal food constituent, namely, the edible fat.

Accordingly, it is the object of my invention to provide chocolate in a readily available form that is miscible and soluble in aqueous fluids at room temperature.

It is a further object of my invention to make chocolate available in such form that the original delicate aroma and flavor is retained.

It is a further object of my invention to make chocolate available in solid powder form.

It is a further object of my invention to mix chocolate with a corn sirup, dehydrate the mixture under heat and vacuum, expand the mixture to cellular structure and reduce the expanded mix to particle size.

It is a further object of my invention to transform chocolate into a powdered material without removing any of its butter fat.

It is a further object of my invention to convert chocolate to such solid form that it is readily miscible with edible fluids.

It is a further object of my invention to transform chocolate into powder at temperatures less than 140° F. so as to retain the volatile and aromatic flavor components of the chocolate.

It is a further object of my invention to provide a novel fluffy, crunchy expanded cellular food product or confection comprising chocolate and corn sirup.

There is a great demand for confections which are sweet but light in taste.

Further, although good volume of confection is desirable from the standpoint of sales appeal and time of consumption, it is not necessary that the confection have a large quantity of edible material.

Accordingly, I have devised a novel confection comprising a mixture of chocolate and corn sirup which can be dehydrated and expanded into a fluffy cellular form since this confection has a delicious true chocolate flavor but is extremely light.

It is a feature of my invention that I can expand the mixture in situ in a mold such as a paper or cardboard cup or other suitable container, and since volumetric expansion on the order of ten times can be effected through my process, the resultant product completely fills the cup or container and solidifies in position.

This expanded material may be coated with chocolate to further retain the flavor contained therein and to prevent the penetration of moisture. My process is such that the product has but a low moisture content and hence is not relatively hygroscopic which serves to maintain the material in its desirable crunchy form.

I shall now describe certain specific illustrations of the process of manufacture of my invention. To form the solid dispersion of chocolate I have described hereinbefore, I mix the chocolate liquor of commerce containing at least 52% fat with corn sirup having a dextrose equivalent of 42. I prefer to use a 42 D. E. corn sirup because of its relatively high dextrin content since the dextrin content, as is more specifically set forth in my co-pending application, Serial No. 351,265, filed August 3, 1940, for Expanded solid corn sirup, provides an elastic framework which makes possible the expanded cellular mass. When I employ the 42 D. E. corn sirup I obtain a very porous light fluffy and friable material which can be used either as a confection per se or which can be ground down to granule size or even to a powder depending upon the particular use for which it is intended.

I wish to point out, however, that I may employ a corn sirup having a high D. E., as for example 55 D. E. and the combination of the chocolate liquor with this high D. E. corn sirup results in a denser finished material since this type of corn sirup has a lesser quantity of dextrin. This denser finished material can be ground in a grinding machine to form chocolate granules which resemble large granules of sugar or the size of the granules may be even further reduced to produce a powdered product.

Returning now to a discussion of the process itself, I first measure out a gallon of 42 D. E. corn sirup and warm it to about 120° F. The corn sirup has a water content of about 20%, but I may use corn sirup havin as low as 14% moisture in which case I vary the amount of chocolate employed in proportion. After the corn sirup is warmed to a temperature of 120° F., I proceed to melt and thoroughly mix into this warm corn sirup five pounds of bitter chocolate liquor free of any sugar. The chocolate is melted and thoroughly mixed with the corn sirup. It is extremely desirable that the temperature not exceed 140° F. as heat above that point harms the delicate flavor and aroma of the chocolate. The mixture of chocolate liquor and corn sirup is then passed through a homogenizing machine to thoroughly mix and homogenize the chocolate in a finely dispersed state in the corn sirup.

Using an apparatus comprising flat pans located on shelves in a closed chamber, as described in my co-pending application, Serial No. 351,265, filed August 3, 1940, for Expanded solid corn sirup, I then pour the homogenized mixture of chocolate with corn sirup into the pans so that the fluid has a depth of about $\frac{7}{8}$ of an inch in the pans. The pans are then placed into the chamber and a vacuum is applied thereto. Although the vacuum may at the beginning be as low as three inches of mercury, it is steadily raised until a relatively high vacuum is employed on the order of one and one-half inches of mercury or less.

When in this specification I refer to a vacuum of an inch or an inch and a half of mercury, I mean a vacuum that is an inch or an inch and a half from perfect vacuum. Mercurial measurements of this vacuum varies according to the atmospheric barometric pressure at the time.

In the meantime I raise the temperature of the fluid mass by means of steam or hot water until the mixture boils. The high vacuum is here important since it is desirable to boil the mixture for the purposes to be set forth, but on the other hand, it is not desirable to apply a high temperature to the chocolate because of its susceptibility to loss of flavor and aroma. The vacuum reduces the boiling point and hence a relatively low temperature may be applied to boil the mix. The boiling drives off the water contained in the mix and gradually renders the mix of chocolate and corn sirup stiffer and more viscous. At a certain point the viscosity of the mixture is such that the bubbles of water vapor developed therein are entrapped in the mixture and prevented from escaping out as would be the case in a fluid mix. The applied heat then acts to expand the water vapor contained in the bubbles and the bubbles grow larger assisted by the negative pressure of the applied vacuum until the bubbles burst into one another forming communicating channels throughout the mass. When the bubbles burst, the water vapor and residual moisture within the mass is driven out by the heat still applied thereto and the high vacuum employed.

The application of heat and vacuum is continued until an optimum of minimum moisture content is arrived at. Such a moisture content at this point may vary from .5 to 2%. The time required for quantities recited above when using a vacuum of about one and one-quarter inches of mercury is about three to four hours. This time varies according to the heat and vacuum employed.

The expansion of the bubbles within the mass during the manufacture expands the entire mass and forms a fluffy, foamy, friable spongy structure. As I have pointed out the dextrin component of the corn sirup being elastic when it contains water forms the elastic framework of the mass. When the mass is dehydrated to a low moisture content as described above, the dextrin solidifies and becomes rigid. The volumetric expansion represents an increase in volume of ten times or more. After the full expansion is obtained and the material has been thoroughly dehydrated, it is cooled and removed from the pans. It can then be broken up into large chunks to be sold as an eating confection or it may be ground into granule or powder size depending upon the use intended.

When the product is to be sold for solution in cold milk, I pass it through a wire screen having about four holes per square inch. These granules are added to milk in the proportion of three-quarters of an ounce of the expanded chocolate corn sirup to eight ounces of cold milk. The granules wet immediately because of their porous structure which is readily entered by the milk and because the outer surfaces are composed of soluble carbohydrate, solids in admixture with the fatty material of the chocolate. The product is readily soluble in cold fluids and the insoluble cellular chocolate material is quickly and easily dispersed in the cold fluid when the soluble constituents are dissolved away from the insoluble fibrous material. The product makes a wholesome beverage, high in calorific and food value.

I may form mixtures of the expanded chocolate corn sirup with various vitamins, enzymes and desirable mineral salts to provide a health food product having a superior chocolate flavor.

In order to prepare a powdered chocolate material which may be employed in the preparation of chocolate drinks either cold or hot and other chocolate products, such as puddings or deserts, I employ as high as eight pounds of chocolate to a gallon of corn sirup. This mixture is expanded as above set forth and the expanded mass is ground in a micro mesh pulverizer or other suitable apparatus to produce a finely divided powdered material.

As I have already pointed out above I may employ a 55 D. E. corn sirup in lieu of the 42 D. E. corn sirup in which case I obtain a harder expanded product which may be ground and sifted to obtain granules having the appearance of sugar with a chocolate color. When I employ a 55 D. E. corn sirup it is essential that I employ a high vacuum.

I obtain certain new and unexpected results by combining vitamins, enzymes and mineral salts with the expanded chocolate corn sirup mix. These vitamins, etc., are employed in relatively minute amounts. I dissolve these vitamins in a carrier solvent, such as water, and intermix the dissolved vitamins with the liquid corn sirup before adding the chocolate. The mixture is again thoroughly effected when the chocolate is added and the expansion and solidification process of my invention in effect freezes the distributed vitamins, etc., in place so that each solid particle of the mass, when it is reduced to particle size contains the correct proportional amount of vitamin, enzyme or mineral salt. This is important because of the difficulties hitherto experienced in getting complete homogeneous distribution of these materials in liquids.

To form a combination of roasted peanuts with corn sirup I first roast the peanuts, remove the shells and then blanch them in order to remove the outer skin. I then grind the peanuts into a finely divided state producing a peanut butter and mix about six pounds of such ground roasted peanuts with one gallon, which is approximately twelve pounds, of corn sirup having a twenty per cent moisture content. The corn sirup has a dry weight of about nine and one-half pounds making a total for the combined corn sirup and peanuts in dry form of fifteen and one-half pounds.

I prefer to employ a 42 D. E. corn sirup because of the high dextrin content whereby I obtain a very porous and light material.

The corn sirup and the peanuts are properly combined by first warming the corn sirup and then mixing the ground peanuts into it in any desired manner. I then pour this liquid mass into a pan so that it forms a layer of approximately $\frac{3}{16}$ of a ninch in depth. The pans are placed in a closed chamber to which a vacuum is applied. The vacuum is relatively high, reaching a vacuum of not more than an inch and one-half of mercury. The mixture is boiled by heat and the porous structure results as pointed out more specifically in connection with the chocolate mix.

An improved confection can also be obtained by adding to the mix of corn sirup and ground peanuts peanuts of substantial size as for example whole peanuts or half peanuts. When the mixture is expanded and solidified the peanut particles are distributed in place throughout the mass. Similarly in the manufacture of the expanded chocolate corn sirup particles of chocolate or other edibles in lump form may be distributed in the mass.

By removing substantially all of the water and moisture, the fatty material is prevented from becoming rancid after it is dried. Additionally I have found that in the mixture of corn sirup and peanuts, the corn sirup or some component thereof has a protecting action with regard to the peanuts and prevents rancidity of the peanuts. Further, I find that the fat of the edible legume is forced out of the mass during the drying process and because of its lighter specific gravity coats the hygroscopic material in the corn sirup, thereby protecting the mass from taking up moisture. This results in a greater resistance to heating which combined with the extreme dryness of the material greatly retards the absorption of moisture from the air. This solid expanded spongy mass of peanuts and corn sirup may be ground down to small granular particles of the size of pop corn which may be employed as a confection per se or it may be further ground to a fine powdered size and then combined with various liquids such as milk to produce wholesome and nourishing beverages.

I have further found that by mixing the ground powder mix of peanuts and corn sirup with a small amount of boiling water and 4X sugar, I prepare a cake icing which may be spread over cakes or cookies in the same manner that chocolate icing is now used. This powdered peanut and corn sirup material may be mixed with powdered desert materials such as gelatin or flour to make mixes which may be employed in making of peanut desserts or peanut flavored cookies. This powder may also be mixed using an ice cream mix so as to prepare peanut flavored ice cream. It is also possible to make a peanut sirup by mixing the powdered peanut corn sirup dispersion with sugar and water.

When making a mix utilizing fats such as cocoanut I first remove the shell from the cocoanut and then pare off the black outer skin. The meat is then ground with or without milk so that there is a finely divided paste. This operation should be carried out in a cold room because of the extreme rapidity with which ground cocoanut becomes rancid. I then warm to about a temperature of 140° F. a gallon or 12 pounds of corn sirup and mix therewith six pounds of finely ground cocoanut meat based on a dry substance. The corn sirup loses its viscosity and the heat melts the fat of the cocoanut so that the particles may be readily dispersed in the corn sirup. The mix may be passed through a suitable homogenizing machine to thoroughly complete the dispersion.

In this mixture I also prefer to employ corn sirup having 42 D. E. and about 43 Bé. However, I may employ a corn sirup having a higher D. E., the resultant product, however, being, as pointed out above, a harder and lesser expanded mass.

I then measure out sufficient of the cocoanut and corn sirup mix so that the finished dry weight contained in a pan having a square area of 720 square inches is about eight pounds. The mixture is then boiled as described above in a vacuum of about one and one-quarter inches of mercury. This vacuum may be slightly varied depending upon the consistency desired in the final product. To obtain a less porous or less expanded mass, I may use a lower vacuum, as for example two or three inches. However, I generally desire a lighter material which is well expanded and for this purpose I use a vacuum of one inch or less of mercury.

After the material is dehydrated, expanded and set, it is removed from the pan and broken into large chunks or ground into granule or powder size. When ground into a powder it may be employed in milk drinks or to form in combination with dry milk, a dry milk powder for beverage purposes. This cocoanut corn sirup powder may be used alone or in combination with other ingredients as a prepared mix in baking and confectionary industries. The finished products contain the fine and rich delicate flavor of the original cocoanut. The reducing sugars maltose and dextrose contained in the corn sirup act to prevent the susceptible cocoanut fat from becoming rancid. Although cocoanut ordinarily will become rancid within a few hours after it is exposed to the air, I have found that conversion to the dehydrated solid form described keeps this dry powder for many months without it becoming rancid.

The processes I have described above exemplify the formation of dry expanded solids by combination of various fats and nuts with corn sirup. In addition to peanuts and cocoanuts I may so convert pecans, walnuts, Brazil nuts, and other nuts to expanded form. The combination of the corn sirup solid with the nut meat acts to retain the flavor during the dehydration process and the grinding of the nut to a fine paste and its homogeneous incorporation in the corn sirup distributes the flavor of the nut completely throughout the mass.

Although I have described my process as being carried out in a pan by which process I secure a mass without definite shape I may also manufacture the product in molds which may be sold as units of confection. Thus, for example, placing the same relative amount of liquid corn sirup and nuts or chocolate in a paper cup, container or suitable mold, I may dehydrate and expand the mass in that mold. As the dehydration and expansion takes place, the mass rises and assumes the shape of the mold with a dome shaped extension therefrom. In lieu of employing paper cups or molds, I may employ edible molds, such as cake cups or ice cream cones, the mix being expanded therein to form the finished confection.

I further may coat the finished expanded mass with a suitable fat such as sweet, bitter or milk chocolate so as to further seal the product from contact with the air, it thereby retaining its fresh, crushable and crunchy nature indefinitely. The product even without the coating is crushable and crunchy but the coating seals this desirable property for an extended period of time.

Further the product does not become sticky and hygroscopic even under conditions of high humidity. Other coatings may be employed in lieu of chocolate, as for example cocoa butter, either with or without flavor.

This desirable sealing effect may also be obtained by breaking down the expanded mass into small lumps and coating this completely with the chocolate or fatty coating. This seals the expanded porous mass against taking up moisture and thus retains its fresh crushable and crunchy nature.

The process as applied to oils, as for example cocoanut oil, is as follows. To about one gallon of corn sirup having a 42 D. E., warmed to a suitable temperature, I add approximately three pounds of cocoanut oil. The liquids are thoroughly mixed and then dehydrated and expanded according to the process as described above. The expanded porous mass is then broken down to a desire particle size which may be used alone or in combination with other materials.

When, for example, I convert lard to this form, I may combine the particles with flour to form a prepared mix which, as pointed out hereinbefore, has the desirable properties of making possible a solid homogeneous mixture of solid shortening and flour. This combination of fats, such as lard, in porous expanded granular form with flour and other suitable ingredients is a prepared baking mix as an article of commerce.

Various other oils may be mixed with corn sirup, dehydrated and expanded according to this process to form a solid dispersed mixture thereof to preserve the same against deterioration and to make the same more available for utility.

Similarly I may convert milk and cream to solid form by concentrating the milk and mixing it thoroughly with corn sirup after which the mixture is dehydrated and expanded according to the process more particularly set forth above. The porous expanded mass resulting is broken down to suitable particle size. Thus, the milk is converted into a desirable solid form, being in combination with dry corn sirup, a sweetener, in the form of porous granules, which are readily soluble in fluids because of their porosity, and physical irregular shape. This concentrated form also is relatively light in weight reducing costs of transportation and insuring a predetermined combination of milk and corn sirup of proper sweetness.

In addition to combining with corn sirup the fats, oils, chocolate and cocoanut that I have set forth, I may also combine with the corn sirup and expand the mixture thereof according to the process set forth, molasses, honey, fruit juices, vegetable, mineral food substances, and other organic materials, edible or unedible.

I have exampled the method of manufacture and products representing various foodstuffs such as fats and oils in combination with corn sirup. It is to be understood that my invention is not to be confined to the particular manufacture which I have exampled but my product may be made by various other methods. Further, there are variations in the processes described which will be apparent to those skilled in the art. I intend to be limited not by the specific description hereinbefore set forth but only by the appended claims.

I claim:

1. A prepared mix comprising flour and a solid expanded cellular mixture in the form of particles having intercommunicating channels, said mixture comprising corn sirup and shortening.

2. The method of forming chocolate sirup which comprises mixing unheated water with an expanded solid mixture of corn sirup and chocolate, said mixture being in the form of a mass having intercommunicating channels.

3. Sugar like granules comprising an expanded solid cellular mixture of corn sirup and a flavoring fat, having intercommunicating channels.

4. In the process of converting a mixture of an edible foodstuff and liquid corn sirup containing a substantial amount of dextrin and water to a dehydrated solid expanded product, the steps of mixing the edible foodstuff and liquid corn sirup to produce a liquid mix; heating the liquid mix in the presence of a vacuum at least as high as 1½ inches of absolute to cause said liquid mix to boil, a part of the water contained in said liquid mix being thus driven off as water vapor in the form of bubbles; continuing the heat and vacuum until sufficient water has been driven off so that the mix becomes a stiff mass of such viscosity that myriads of water vapor bubbles are unable to escape and are entrapped therein; causing the entrapped water vapor bubbles to expand under the influence of heat and vacuum applied thereto so as to expand the mix; applying further heat and vacuum so as to dehydrate the dextrin of the mix and cause it to become substantially rigid and thus set said mixture of corn sirup and edible foodstuff in the form of a solid dehydrated expanded cellular mass.

5. In the process of converting a mixture of an edible foodstuff and liquid corn sirup containing a substantial amount of dextrin and water to a dehydrated solid expanded product, the steps of mixing the edible food stuff and liquid corn sirup to produce a liquid mix; heating the liquid mix in the presence of a vacuum at least as high as 1½ inches of absolute to cause said liquid mix to boil, a part of the water contained in said liquid mix being thus driven off as water vapor in the form of bubbles; continuing the heat and vacuum until sufficient water has been driven off so that the mix becomes a stiff mass of such viscosity that the water vapor bubbles are entrapped therein; causing the entrapped water vapor bubbles to expand under the influence of the heat and vacuum applied thereto so as to expand the mix, the expanding bubbles breaking into one another and breaking open at the surface of the mass to form intercommunicating channels in the interior of the relatively stiff mix which channels communicate with the exterior of the mass by such surface breaking; applying further heat and vacuum so as to dehydrate the dextrin of the mix and cause it to become substantially rigid and to drive out the moisture from the exposed interior of the mix and thus set the said mixture of corn sirup and edible foodstuff in the form of a solid dehydrated expanded mass having intercommunicating cells.

6. In the process of converting a mixture of a fat and liquid corn sirup containing a substantial amount of dextrin and water to a dehydrated solid expanded product, the steps of mixing the fat and liquid corn sirup to produce a liquid mix; heating the liquid mix in the presence of a vacuum at least as high as 1½ inches of absolute to cause said liquid mix to boil, a part of the water contained in said liquid mix being thus driven off as water vapor in the form of bubbles; continuing the heat and vacuum until sufficient water has been driven off so that the mix becomes a stiff mass of such viscosity that the water vapor bubbles are entrapped therein; causing the entrapped water vapor bubbles to expand under the influence of the heat and vacuum applied thereto so as to expand the mix, the expanding bubbles breaking into one another and breaking open at the surface of the mass to form intercommunicating channels in the interior of the relatively stiff mix which channels communicate with the exterior of the mass by such surface breaking; applying further heat and vacuum so as to dehydrate the dextrin of the mix and cause it to become substantially rigid and to drive out the moisture from the exposed interior of the mix and thus set the said mixture of corn sirup and fat in the form of a solid dehydrated expanded mass having intercommunicating cells.

7. In the process of converting a mixture of an oil and liquid corn sirup containing a substantial amount of dextrin and water to a dehydrated solid expanded product, the steps of mixing the oil and liquid corn sirup to produce a liquid mix; heating the liquid mix in the presence of a vacuum at least as high as 1½ inches of absolute to cause said liquid mix to boil, a part of the water contained in said liquid mix being thus driven off as water vapor in the form of bubbles; continuing the heat and vacuum until sufficient water has been driven off so that the mix becomes a stiff mass of such viscosity that the water vapor bubbles are entrapped therein; causing the entrapped water vapor bubbles to expand under the influence of the heat and vacuum applied thereto so as to expand the mix, the expanding bubbles breaking into one another and breaking open at the surface of the mass to form intercommunicating channels in the interior of the relatively stiff mix which channels communicate with the exterior of the mass by such surface breaking; applying further heat and vacuum so as to dehydrate the dextrin of the mix and cause it to become substantially rigid and to drive out the moisture from the exposed interior of the mix and thus set the said mixture of corn sirup and oil in the form of a solid dehydrated expanded mass having intercommunicating cells.

8. In the process of converting a mixture of a fat and liquid corn sirup containing a substantial amount of dextrin and water to a dehydrated solid expanded product, the steps of warming the corn sirup; mixing the fat and liquid corn sirup to produce a liquid mix; heating the liquid mix in the presence of a vacuum at least as high as 1½ inches of absolute to cause said liquid mix to boil, a part of the water contained in said liquid mix being thus driven off as water vapor in the form of bubbles; continuing the heat and vacuum until sufficient water has been driven off so that the mix becomes a stiff mass of such viscosity that the water vapor bubbles are entrapped therein; causing the entrapped water vapor bubbles to expand under the influence of the heat and vacuum applied thereto so as to expand the mix, the expanding bubbles breaking into one another and breaking open at the surface of the mass to form intercommunicating channels in the interior of the relatively stiff mix which channels communicate with the exterior of the mass by such surface breaking; applying further heat and vacuum so as to dehydrate the dextrin of the mix and cause it to become substantially rigid and to drive out the moisture from the exposed interior of the mix and thus set the said mixture of corn sirup and fat in the form of a solid dehydrated expanded mass having intercommunicating cells.

9. In the process of converting a mixture of an edible foodstuff and liquid corn sirup containing a substantial amount of dextrin and water to a dehydrated solid expanded product, the steps of mixing the edible foodstuff and liquid corn sirup to produce a liquid mix; pouring the liquid mix into a mold; heating the liquid mix in the presence of a vacuum at least as high as 1½ inches of absolute to cause said liquid mix to boil, a part of the water contained in said liquid mix being thus driven off as water vapor in the form of bubbles; continuing the heat and vacuum until sufficient water has been driven off so that the mix becomes a stiff mass of such viscosity that the water vapor bubbles are entrapped therein; causing the entrapped water vapor bubbles to expand under the influence of the heat and vacuum applied thereto so as to expand the mix, the expanding bubbles breaking into one another and breaking open at the surface of the mass to form intercommunicating channels in the interior of the relatively stiff mix which channels communicate with the exterior of the mass by such surface breaking; applying further heat and vacuum so as to dehydrate the dextrin of the mix and cause it to become substantially rigid and to drive out the moisture from the exposed interior of the mix and thus set the said mixture of corn sirup and edible foodstuff in the form of a solid dehydrated expanded mass having intercommunicating cells in situ in the mold.

10. In the process of converting a mixture of an edible foodstuff and liquid corn sirup containing a substantial amount of dextrin and water to a dehydrated solid expanded product, the steps of mixing the edible foodstuff and liquid corn sirup to produce a liquid mix; heating the liquid mix in the presence of a vacuum at least as high as 1½ inches of absolute to cause said liquid mix to boil, a part of the water contained in said liquid mix being thus driven off as water vapor in the form of bubbles; continuing the heat and vacuum until sufficient water has been driven off so that the mix becomes a stiff mass of such viscosity that the water vapor bubbles are entrapped therein; causing the entrapped water vapor bubbles to expand under the influence of the heat and vacuum applied thereto so as to expand the mix, the expanding bubbles breaking into one another and breaking open at the surface of the mass to form intercommunicating channels in the interior of the relatively stiff mix which channels communicate with the exterior of the mass by such surface breaking; applying further heat and vacuum so as to dehydrate the dextrin of the mix and cause it to become substantially rigid and to drive out the moisture from the exposed interior of the mix, thus setting the said mixture of corn sirup and edible foodstuff in the form of a solid dehydrated expanded mass having intercommunicating cells, and coating the exposed portion of the expanded mixture with a fatty coating material.

11. In the process of converting a mixture of an edible foodstuff and liquid corn sirup containing a substantial amount of dextrin and water to a dehydrated solid expanded product, the steps of mixing the edible foodstuff and liquid corn sirup to produce a liquid mix; heating the liquid mix in the presence of a vacuum at least as high as 1½ inches of absolute to cause said liquid mix to boil, a part of the water contained in said liquid mix being thus driven off as water vapor in the form of bubbles; continuing the heat and vacuum until sufficient water has been driven off so that the mix becomes a stiff mass of such viscosity that the water vapor bubbles are entrapped therein; causing the entrapped water vapor bubbles to expand under the influence of the heat and vacuum applied thereto so as to expand the mix, the expanding bubbles breaking into one another and breaking open at the surface of the mass to form intercommunicating channels in the interior of the relatively stiff mix which channels communicate with the exterior of the mass by such surface breaking; applying further heat and vacuum so as to dehydrate the dextrin of the mix and cause it to become substantially rigid and to drive out the moisture from the exposed interior of the mix thus setting the said mixture of corn sirup and edible foodstuff in the form of a solid dehydrated expanded mass having intercommunicating cells, and breaking down said expanded mixture to bodies of small size.

12. A product which comprises an expanded solid dehydrated mixture of a corn sirup and an edible foodstuff, containing intercommunicating channels throughout the product.

13. A product which comprises an expanded solid dehydrated mixture of corn sirup and a substance which comprises fat, containing intercommunicating channels throughout the product.

14. A product which comprises an expanded solid dehydrated mixture of corn sirup and a substance which comprises oil, containing intercommunicating channels throughout the product.

15. A product which comprises an expanded solid dehydrated mixture of corn sirup and a substance which comprises chocolate, containing intercommunicating channels throughout the product.

16. A mixture of corn sirup and an edible foodstuff expanded in situ in a container to form an expanded mass having intercommunicating channels, the exposed portion of said expanded mixture being coated with a substance comprising a fat.

WILBERT A. HEYMAN.